(12) United States Patent
Clark

(10) Patent No.: US 9,409,363 B2
(45) Date of Patent: *Aug. 9, 2016

(54) METHOD OF MANUFACTURING BULKED CONTINUOUS FILAMENTS

(71) Applicant: Mohawk Industries, Inc., Marietta, GA (US)

(72) Inventor: Thomas Clark, Chattanooga, TN (US)

(73) Assignee: Mohawk Industries, Inc., Marietta, GA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/256,261

(22) Filed: Apr. 18, 2014

(65) Prior Publication Data

US 2014/0225293 A1 Aug. 14, 2014

Related U.S. Application Data

(60) Continuation of application No. 13/892,713, filed on May 13, 2013, which is a division of application No. 13/721,955, filed on Dec. 20, 2012, now Pat. No. 8,597,553.

(60) Provisional application No. 61/654,016, filed on May 31, 2012.

(51) Int. Cl.
*D01D 1/10* (2006.01)
*D01D 5/08* (2006.01)
(Continued)

(52) U.S. Cl.
CPC ............ *B29D 99/0078* (2013.01); *B29B 17/00* (2013.01); *B29C 47/0014* (2013.01);
(Continued)

(58) Field of Classification Search
CPC .. B29B 17/00; B29B 17/02; B29B 2017/001; B29B 2017/0015; B29B 2017/0203; B29C 47/0014; B29C 47/0071; B29C 47/365; B29C 47/366; B29C 47/42; B29C 47/48; B29C 47/50; B29C 47/70; B29C 47/702; B29C 47/765; B29C 47/766; B29C 47/767; B29C 47/92; B29C 2947/922; B29C 2947/92514; B29D 99/0078; D01D 1/10; D01D 1/103; D01D 1/106; D01D 5/08; D01D 13/00; D01D 13/02; D01F 6/62; D02G 3/24

USPC .................. 264/40.1, 101, 102, 169, 211.22, 264/211.23

See application file for complete search history.

(56) References Cited

U.S. PATENT DOCUMENTS 3,938,924 A * 2/1976 Abella et al. .................. 425/147
5,886,058 A * 3/1999 Van Erden et al. ............. 521/48
(Continued)

FOREIGN PATENT DOCUMENTS

CN 202007825 U 12/2011
CN 202072825 U 12/2011
(Continued)

OTHER PUBLICATIONS

International Preliminary Report on Patentability, dated Dec. 11, 2014, from corresponding International Application No. PCT/2013/040753.

(Continued)

Primary Examiner — Leo B Tentoni
(74) Attorney, Agent, or Firm — Brient Globerman, LLC

(57) ABSTRACT

A method of manufacturing bulked continuous carpet filament which, in various embodiments, comprises: (A) grinding recycled PET bottles into a group of flakes; (B) washing the flakes; (C) identifying and removing impurities, including impure flakes, from the group of flakes; (D) passing the group of flakes through an MRS extruder while maintaining the pressure within the MRS portion of the MRS extruder below about 5 millibars; (E) passing the resulting polymer melt through at least one filter having a micron rating of less than about 50 microns; and (F) forming the recycled polymer into bulked continuous carpet filament that consists essentially of recycled PET.

20 Claims, 5 Drawing Sheets

(51) Int. Cl.
*D01D 13/00* (2006.01)
*D01D 13/02* (2006.01)
*D02G 3/24* (2006.01)
*B29D 99/00* (2010.01)
*B29C 47/76* (2006.01)
*D01D 5/00* (2006.01)
*B29C 47/00* (2006.01)
*B29C 47/42* (2006.01)
*C08J 11/04* (2006.01)
*D01F 6/62* (2006.01)
*B29C 47/36* (2006.01)
*B29C 47/50* (2006.01)
*B29C 47/92* (2006.01)
*B29B 17/00* (2006.01)

(52) U.S. Cl.
CPC ............. *B29C47/366* (2013.01); *B29C 47/42* (2013.01); *B29C 47/50* (2013.01); *B29C 47/766* (2013.01); *B29C 47/92* (2013.01); *C08J 11/04* (2013.01); *D01D 1/103* (2013.01); *D01D 5/00* (2013.01); *D01F 6/62* (2013.01); *B29B 2017/0015* (2013.01); *B29C 2947/92514* (2013.01); *C08J 2367/02* (2013.01)

(56) References Cited

U.S. PATENT DOCUMENTS

| | | | |
|---|---|---|---|
| 7,513,677 | B2 † | 4/2009 | Gneuss |
| 8,735,457 | B2 | 5/2014 | Booth et al. |
| 8,741,972 | B2 | 6/2014 | Booth et al. |
| 2002/0086077 | A1* | 7/2002 | Noller et al. ............ 425/145 |
| 2004/0072920 | A1 | 4/2004 | Goedicke et al. |
| 2005/0047267 | A1 | 3/2005 | Gneuss et al. |
| 2005/0062186 | A1* | 3/2005 | Fellinger ............ 264/102 |
| 2007/0200269 | A1* | 8/2007 | Ichikawa et al. .......... 264/140 |
| 2009/0039542 | A1 | 2/2009 | Morton-Finger |
| 2010/0152309 | A1* | 6/2010 | Booth et al. ............ 521/40.5 |
| 2010/0152311 | A1 | 6/2010 | Booth et al. |

FOREIGN PATENT DOCUMENTS

| | | |
|---|---|---|
| DE | 19722278 A1 † | 12/1998 |
| DE | 102008018686 A1 | 10/2009 |
| WO | 2010133531 A1 | 11/2010 |
| WO | WO2010133531 A1 | 11/2010 |

OTHER PUBLICATIONS

"MRS extrusion technology offers new options in PET", Plastics Additives and Compounding, Elsevier Science, Oxford, GB, val. 11, No. 2, Mar. 1, 2009, pp. 24-26, XP026067788, ISSN: 1464-391 X, DOI: 1 0.1 016/S1464-391 X(09)70050-9 [retrieved on Mar. 1, 2009].

Gneuss M: "Multi Rotation System Extruder Leads to Breakthrough in Polymer Evacuation", International Fiber Journal, International Media Group, Charlotte, NC, US, val. 23, No. 1, Feb. 1, 2008, pp. 40-41, XPOO 1514827, I SSN: 1 049-801 X.

Gneuss, Multi Rotation System Extruder Leads to Breakthrough in Polymer Evacuation, Journal, Feb. 1, 2008, pp. 40-41, vol. 23, Nol. 1, International Fiber Journal, International Media Group, Charlotte, North Carolina, United States.

MRS extrusion technology offers new options in PET, Mar. 1, 2009, pp. 24-26, vol. 11, No. 2, Plastic Additives and Compounding, Elsevier Science, Oxford, Great Britain.

Extended European Search Report from corresponding European Application No. EP15158377 dated Aug. 18, 2015.

Examination Report from corresponding Australian Application No. 2014215998 dated Aug. 26, 2015.

Hannemann, Innovative Aufbereitungslosung für PET mit uneingeschrankter FDA—Lebensmittelzulassung, Presentation, Mar. 15, 2012, 37 pages total, Gneuss Kunststofftechnik GmbH, Germany.

Notice of Opposition from corresponding European Application No. EP13728264 dated Dec. 7, 2015.

"Processing Technology:Processing of Polymer Melts," Oct. 31, 2007, Gneuss Kunststofftechnik GmbH, Dusseldorf, Germany.†

"MRS Extruder and Rotary Filtration Offer New Possibilities in PET Recycling," Apr. 30, 2009, International Fiber Journal, Charlotte, NC, United States.†

\* cited by examiner
† cited by third party

US 9,409,363 B2

METHOD OF MANUFACTURING BULKED CONTINUOUS FILAMENTS

CROSS REFERENCE TO RELATED APPLICATION

This application is a continuation of U.S. patent application Ser. No. 13/892,713, filed May 13, 2013, entitled "Systems and Methods for Manufacturing Bulked Continuous Filament", which is a divisional of U.S. patent application Ser. No. 13/721,955, filed Dec. 20, 2012, entitled "Systems and Methods for Manufacturing Bulked Continuous Filament", which claimed priority from U.S. Patent Application No. 61/654,016, filed May 31, 2012, entitled "Systems and Methods for Manufacturing Bulked Continuous Fiber," all of which are hereby incorporated herein by reference in their entirety.

BACKGROUND

Because pure virgin PET polymer is more expensive than recycled PET polymer, and because of the environmental benefits associated with using recycled polymer, it would be desirable to be able to produce bulked continuous carpet filament from 100% recycled PET polymer (e.g., PET polymer from post-consumer PET bottles).

SUMMARY

A method of manufacturing bulked continuous carpet filament, according to particular embodiments comprises: (A) providing a multi-screw extruder; (B) using a pressure regulation system to reduce a pressure within the multi-screw extruder to below about 5 millibars; (C) while maintaining the pressure within the multi-screw extruder below about 5 millibars, passing a melt comprising recycled polymer through the multi-screw extruder; and (D) after the step of passing the melt of recycled polymer through the multi-screw extruder, forming the recycled polymer into bulked continuous carpet filament. In various embodiments, the multi-screw extruder comprises: (i) a first satellite screw extruder comprising a first satellite screw that is mounted to rotate about a central axis of the first satellite screw; (ii) a second satellite screw extruder comprising a second satellite screw that is mounted to rotate about a central axis of the second satellite screw; and (iii) the pressure regulation system that is adapted to maintain a pressure within the first and second satellite screw extruders below about 5 millibars. In particular embodiments, when passing the melt comprising recycled polymer through the multi-screw extruder: (1) a first portion of the melt passes through the first satellite screw extruder; and (2) a second portion of the melt passes through the second satellite screw extruder.

An extruder for use in extruding a polymer melt, according to particular embodiments, comprises: (1) a first satellite screw extruder comprising a first satellite screw that is mounted to rotate about a central axis of the first satellite screw; (2) a second satellite screw extruder comprising a second satellite screw that is mounted to rotate about a central axis of the second satellite screw; and (3) a pressure regulation system that is adapted to maintain a pressure within the first and second satellite screw extruders below a pressure of about 1.5 millibars as the polymer melt passes through the first and second screw extruders.

A bulked continuous carpet filament, according to various embodiments, consists essentially of a recycled polymer.

A method of manufacturing carpet filament, according to particular embodiments, comprises the steps of: (A) washing a group of polymer flakes to remove at least a portion of one or more contaminants from a surface of the flakes, the group of flakes comprising a first plurality of flakes that consist essentially of PET and a second plurality of flakes that do not consist essentially of PET; (B) after the step of washing the first plurality of flakes: (i) scanning the washed group of flakes to identify the second plurality of flakes, and (ii) separating thesecond plurality of flakes from the first plurality of flakes; (C) melting the second plurality of flakes to produce a polymer melt; (D) providing an extruder that extrudes material in a plurality of different extrusion streams; (E) reducing a pressure within the extruder to below about 5 millibars; (F) while maintaining the pressure within the extruder below about 5 millibars, passing the polymer melt through the extruder so that the polymer melt is divided into a plurality of extrusion streams, each having a pressure below about 5 millibars; (G) after passing the polymer melt through the extruder, filtering the polymer melt through at least one filter; and (H) after passing the polymer melt through the filter, forming the recycled polymer into bulked continuous carpet filament.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Figure 1:
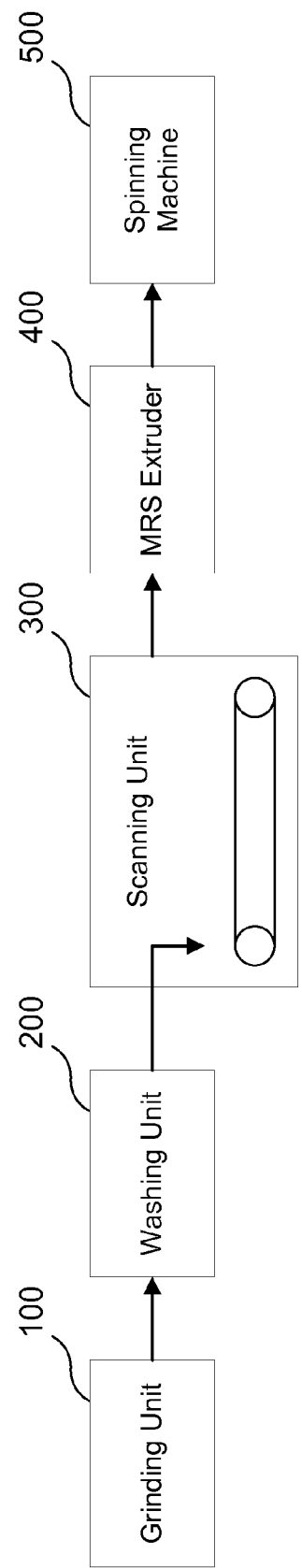
FIG. 1 depicts a process flow, according to a particular embodiment, for manufacturing bulked continuous carpet filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

I. Overview

New processes for making fiber from recycled polymer (e.g., recycled PET polymer) are described below. In various embodiments, this new process: (1) is more effective than earlier processes in removing contaminates and water from the recycled polymer; and/or (2) does not require the polymer to be melted and cooled as many times as in earlier processes. In at least one embodiment, the improved process results in a recycled PET polymer having a polymer quality that is high enough that the PET polymer may be used in producing bulked continuous carpet filament from 100% recycled PET content (e.g., 100% from PET obtained from previously used PET bottles). In particular embodiments, the recycled PET polymer has an intrinsic viscosity of at least about 0.79 dL/g (e.g., of between about 0.79 dL/g and about 1.00 dL/g).

II. More Detailed Discussion

A BCF (bulked continuous filament) manufacturing process, according to a particular embodiment, may generally be broken down into three steps: (1) preparing flakes of PET polymer from post-consumer bottles for use in the process; (2) passing the flakes through an extruder that melts the flakes and purifies the resulting PET polymer; and (3) feeding the purified polymer into a spinning machine that turns the polymer into filament for use in manufacturing carpets. These three steps are described in greater detail below.

STEP 1: Preparing Flakes of PET Polymer from Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oregon, or the Spyder IR machine from National Recovery Technologies of Nashville, Tennessee, may be utilized to remove any loose polymeric contaminants that may be mixed in with the PET flakes (e.g., PVC, PLA, PP, PE, PS, and PA). Additionally, automated X-ray sorting equipment such as a VINYLCYCLE machine from National Recovery Technologies of Nashville, Tennessee may be utilized to remove remaining PVC contaminants.

In particular embodiments, a binary segregation of the clear materials from the colored materials is achieved using automated color sorting equipment equipped with a camera detection system (e.g., an Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50 B Granulator machine from Cumberland Engineering Corporation of New Berlin, Wisconsin) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Florida) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTI-MIX machine from TSM Control Systems of Dundalk, Ireland) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above.

STEP 2: Using an Extrusion System to Melt and Purify PET Flakes

Figure 2:
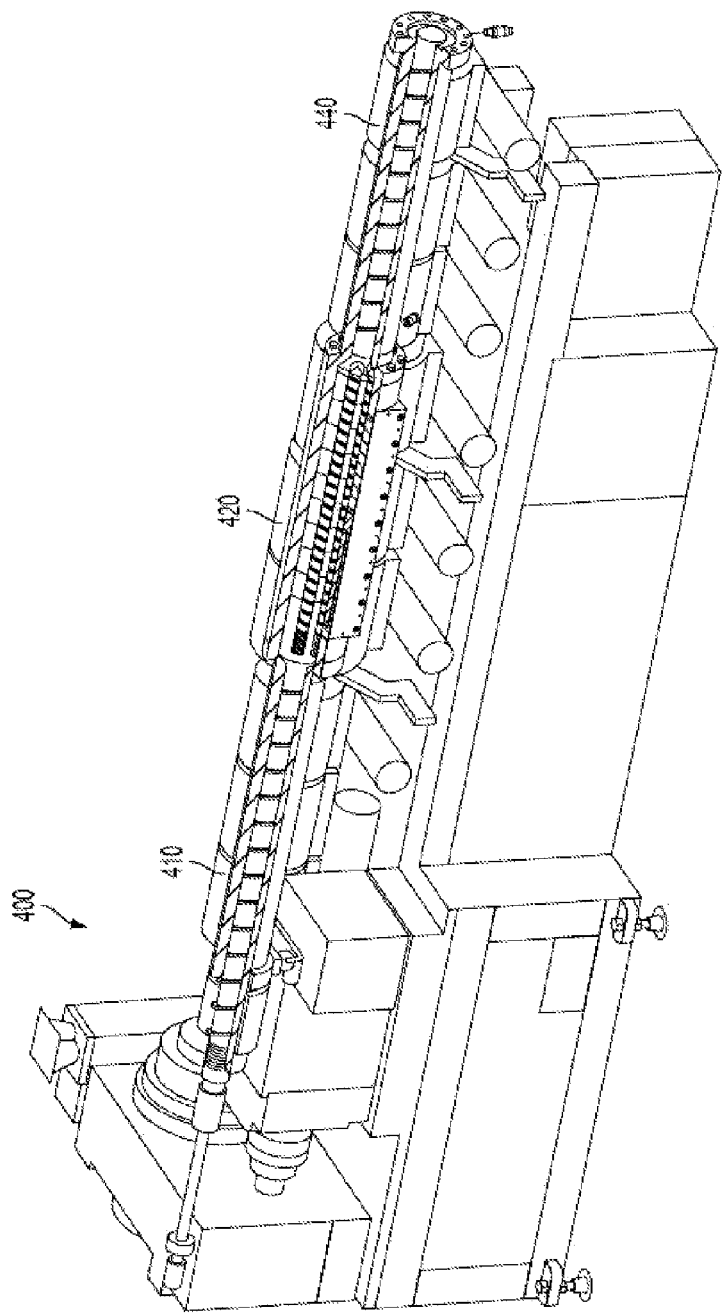
FIG. 2 is a perspective view of an MRS extruder that is suitable for use in the process of FIG. 1.
Figure 3:
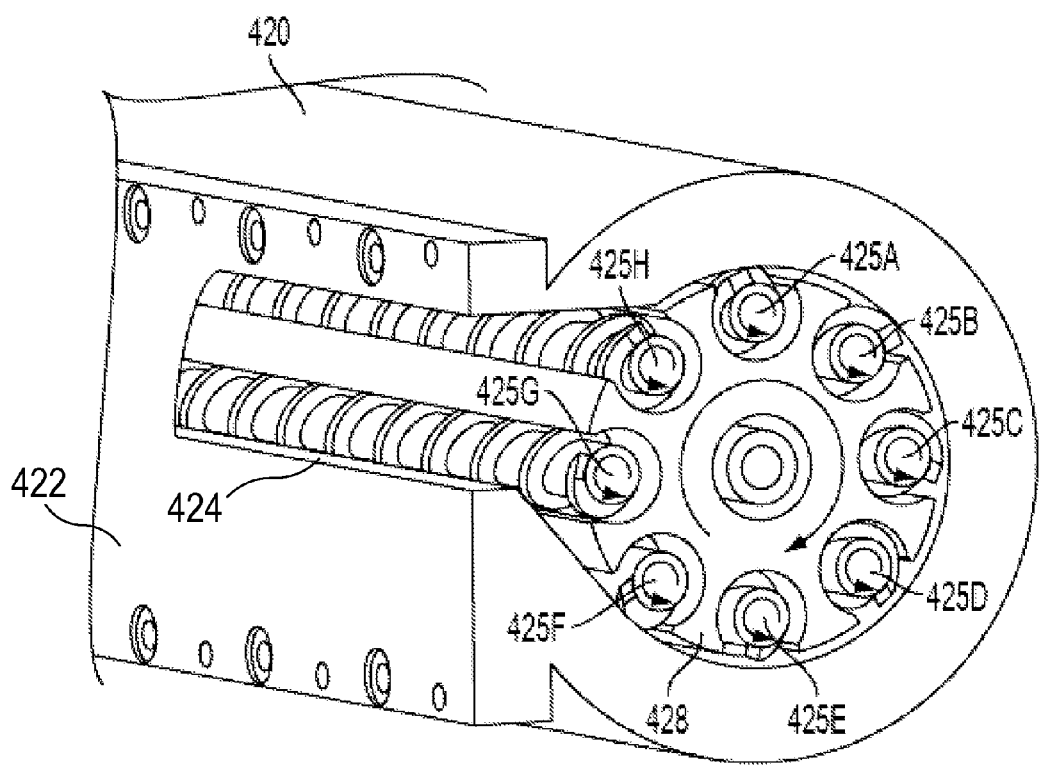
FIG. 3 is a cross-sectional view of an exemplary MRS section of the MRS extruder of FIG. 2.

In particular embodiments, an extruder is used to turn the wet flakes described above into a molten recycled PET polymer and to perform a number of purification processes to prepare the polymer to be turned into BCF for carpet. As noted above, in various embodiments, after STEP 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 2 and 3. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes (e.g., remove all of the surface and interstitial water from the flakes).

Figure 4:
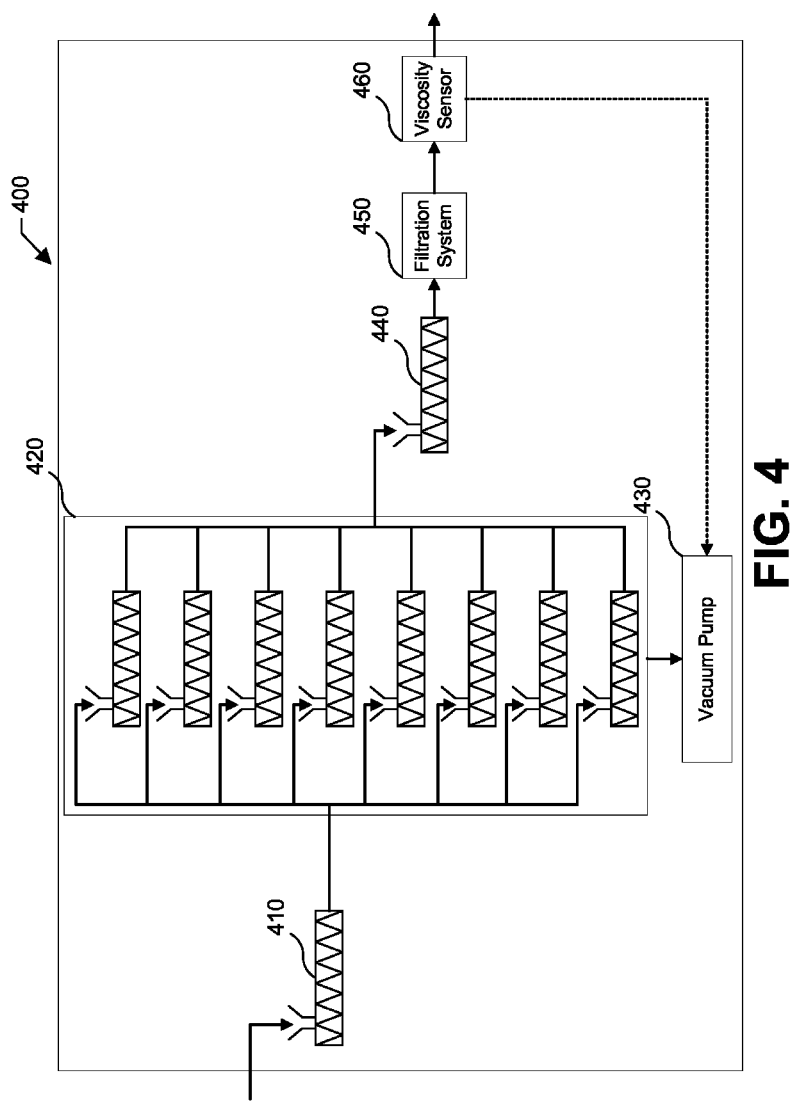
FIG. 4 depicts a process flow depicting the flow of polymer through an MRS extruder and filtration system according to a particular embodiment.

FIG. 4 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted flakes), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 2, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 3, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 4, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In a particular example, the Vacuum Pump 430 comprises three mechanical lobe vacuum pumps (e.g., arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run the through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt. Thus, this filtration step may be advantageous in removing particulate contaminates (e.g., particulate contaminates that were not removed in the MRS Section 420).

In particular embodiments, a viscosity sensor 460 (see FIG. 4) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.79 dL/g (e.g., of between about 0.79 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above, as well as from unreacted water generated by the melting of the PET polymer in the single screw heater 410 (e.g., interstitial water). In particular embodiments, the majority of water present in the polymer is wash water, but some percentage may be unreacted water.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 3: Purified PET Polymer Fed into Spinning Machine to be Turned into Carpet Yarn In particular embodiments, after the recycled PET polymer has been extruded and purified by the above-described extrusion process, the resulting molten recycled PET polymer is fed directly into a BCF (or "spinning") machine 500 that is configured to turn the molten polymer into bulked continuous filament. For example, in various embodiments, the output of the MRS extruder 400 is connected substantially directly (e.g., directly) to the input of the spinning machine 500 so that molten polymer from the extruder is fed directly into the spinning machine 500. This process may be advantageous because molten polymer may, in certain embodiments, not need to be cooled into pellets after extrusion (as it would need to be if the recycled polymer were being mixed with virgin PET polymer). In particular embodiments, not cooling the recycled molten polymer into pellets serves to avoid potential chain scission in the polymer that might lower the polymer's intrinsic viscosity.

In particular embodiments, the spinning machine 500 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 500 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the spinning machine 500 than would be possible using pure virgin PET polymer. This may allow for higher processing speeds than are possible when using virgin PET polymer.

Summary of Exemplary Process

Figure 5:
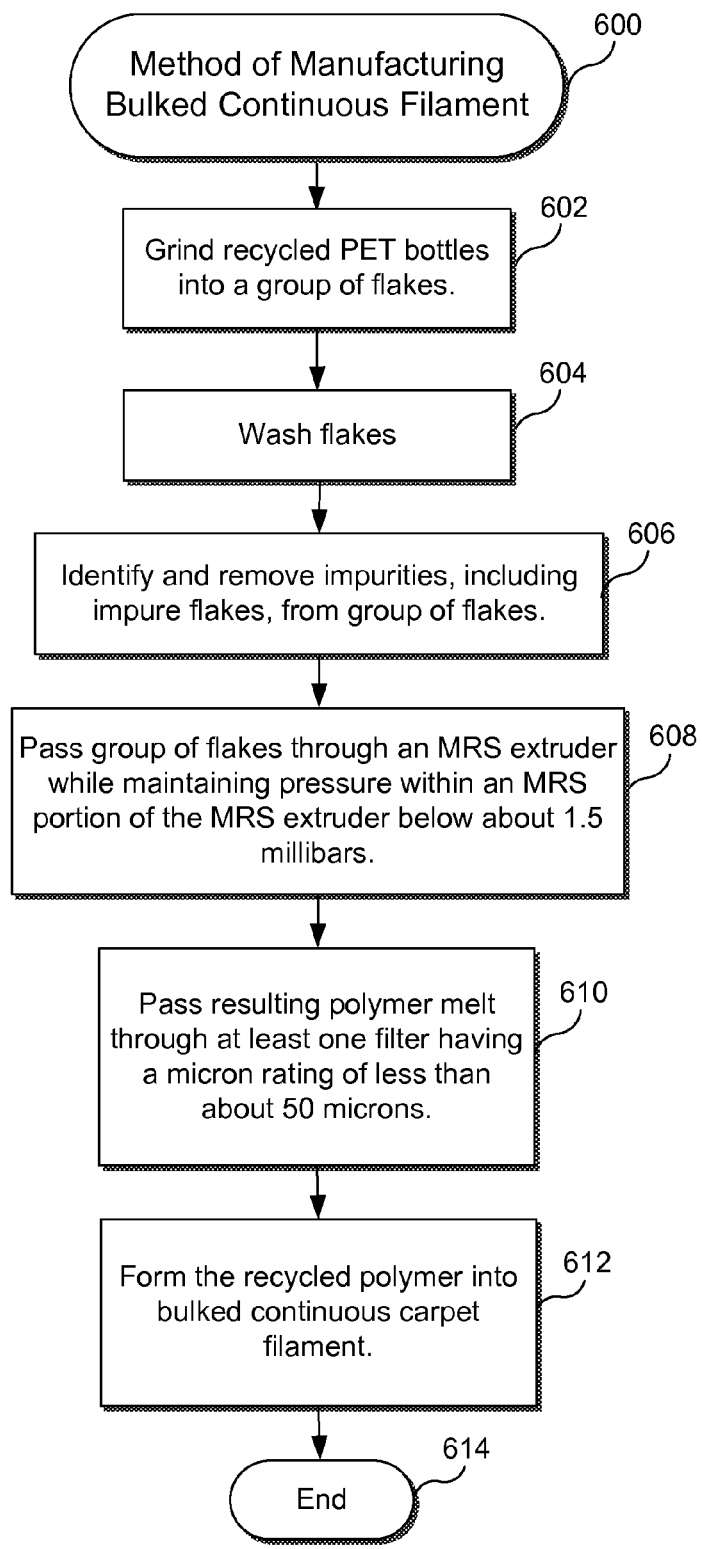
FIG. 5 is a high-level flow chart of a method, according to various embodiments, of manufacturing bulked continuous carpet filament.

FIG. 5 provides a high-level summary of the method of manufacturing bulked continuous filament described above. As shown in the figure, the method begins at Step 602, where recycled PET bottles are ground into a group of flakes. Next, at Step 604, the group of flakes is washed to remove contaminants from the flakes' respective outer surfaces. Next, at Step 606, the group of flakes is scanned (e.g., using one or more of the methods discussed above) to identify impurities, including impure flakes. These impurities, and impure flakes, are then removed from the group of flakes.

Next, at Step 608, the group of flakes is passed through an MRS extruder while maintaining the pressure within an MRS portion of the extruder below about 1.5 millibars. At Step 610, the resulting polymer melt is passed through at least one filter having a micron rating of less than about 50 microns. Finally, at Step 612, the recycled polymer is formed into bulked continuous carpet filament, which may be used in producing carpet. The method then ends at Step 614.

Alternative Embodiments

In particular embodiments, the system may comprise alternative components or perform alternative processes in order to produce substantially continuous BCF from 100% recycled PET, or other recycled polymer. Exemplary alternatives are discussed below.

Non-MRS Extrusion System

In particular embodiments, the process may utilize a polymer flow extrusion system other than the MRS Extruder described above. The alternative extrusion system may include for example, a twin screw extruder, a multiple screw extruder, a planetary extruder, or any other suitable extrusion system. In a particular embodiment, the process may include a plurality of any combination of any suitable conical screw extruders (e.g., four twin screw extruders, three multiple screw extruders, etc.).

Making Carpet Yarn from 100% Recycled Carpet

In particular embodiments, the process described above may be adapted for processing and preparing old carpet (or any other suitable post-consumer product) to produce new carpet yarn comprising 100% recycled carpet. In such embodiments, the process would begin by grinding and washing recycled carpet rather than recycled PET bottles. In various embodiments where old carpet is converted into new carpet yarn comprising 100% recycled carpet, the process may comprise additional steps to remove additional materials or impurities that may be present in recycled carpet that may not be present in recycled PET bottles (e.g., carpet backing, adhesive, etc.).

Other Sources of Recycled PET

In various embodiments, the process described above is adapted for processing recycled PET from any suitable source (e.g., sources other than recycled bottles or carpet) to produce new carpet yarn comprising 100% recycled PET.

CONCLUSION

Many modifications and other embodiments of the invention will come to mind to one skilled in the art to which this invention pertains having the benefit of the teachings presented in the foregoing descriptions and the associated drawings. For example, although the vacuum system discussed above is described as being configured to maintain the pressure in the open chambers of the MRS extruder to about 1 mbar, in other embodiments, the vacuum system may be adapted to maintain the pressure in the open chambers of the MRS extruder at pressures greater than, or less than, 1 mbar. For example, the vacuum system may be adapted to maintain this pressure at between about 0.5 mbar and about 1.2 mbar.

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Also, while various embodiments are discussed above in regard to producing carpet filament from PET, similar techniques may be used to produce carpet filament from other polymers. Similarly, while various embodiments are discussed above in regard to producing carpet filament from PET, similar techniques may be used to produce other products from PET or other polymers.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

I claim:

1. A method of manufacturing bulked continuous carpet filament, said method comprising:
   (A) providing a multi-screw extruder that comprises:
      (i) a first satellite screw extruder, said first satellite screw extruder comprising a first satellite screw that is mounted to rotate about a central axis of said first satellite screw;
      (ii) a second satellite screw extruder, said second satellite screw extruder comprising a second satellite screw that is mounted to rotate about a central axis of said second satellite screw;
      (iii) a third satellite screw extruder, said third satellite screw extruder comprising a third satellite screw that is mounted to rotate about a central axis of said third satellite screw;
      (iv) a fourth satellite screw extruder, said fourth satellite screw extruder comprising a fourth satellite screw that is mounted to rotate about a central axis of said fourth satellite screw; and
      (v) a pressure regulation system that is adapted to maintain a pressure within said first, second, third, and fourth satellite screw extruders between about 0 millibars and about 5 millibars;
   (B) using said pressure regulation system to reduce a pressure within said first, second, third, and fourth satellite screw extruders to between about 0 millibars and about 5 millibars;
   (C) while maintaining said pressure within said first, second, third, and fourth satellite screw extruders between about 0 millibars and about 5 millibars, passing a melt comprising recycled polymer through said multi-screw extruder so that: (1) a first portion of said melt passes through said first satellite screw extruder, (2) a second portion of said melt passes through said second satellite screw extruder, (3) a third portion of said melt passes through said third satellite screw extruder, and (4) a fourth portion of said melt passes through said fourth satellite screw extruder; and
   (D) after said step of passing said melt of recycled polymer through said multi-screw extruder, forming said recycled polymer into bulked continuous carpet filament.

2. The method of claim 1, wherein said multi-screw extruder comprises a satellite screw extruder support system that is adapted to rotate said first, second, third, and fourth satellite screws about a main axis, said main axis being substantially parallel to: (a) said central axis of said first satellite screw; (b) said central axis of said second satellite screw; (c) said central axis of said third satellite screw; and (d) said central axis of said fourth satellite screw.

3. The method of claim 2, wherein said step of passing said melt of recycled polymer through said multi-screw extruder occurs while said first, second, third, and fourth satellite screw extruders are orbitally rotating about said main axis.

4. The method of claim 1, wherein said recycled polymer consists essentially of recycled polyethylene terephthalate.

5. The method of claim 4, wherein said pressure regulation system comprises a jet vacuum pump.

6. The method of claim 2, wherein:
said satellite screw extruder support system comprises a drum that is adapted to rotate about said main axis;
said drum defines a first screw barrel having a central axis that is substantially parallel to said main axis;
said drum defines a second screw barrel having a central axis that is substantially parallel to said main axis;
said drum defines a third screw barrel having a central axis that is substantially parallel to said main axis;
said drum defines a fourth screw barrel having a central axis that is substantially parallel to said main axis;
said first satellite screw is rotatably mounted within said first screw barrel;
said second satellite screw is rotatably mounted within said second screw barrel;
said third satellite screw is rotatably mounted within said third screw barrel; and
said fourth satellite screw is rotatably mounted within said fourth screw barrel.

7. The method of claim 1, wherein:
said extruder is a first extruder; and
said method further comprises:
passing a plurality of flakes of recycled PET through a second extruder; and
while passing said plurality of flakes through said second extruder, using said second extruder to heat said plurality of flakes to a temperature that is sufficient to at least substantially melt said plurality of flakes to form said polymer melt.

8. The method of claim 7, wherein said method further comprises:
before said step of passing said plurality of flakes through said second extruder:
washing said plurality of flakes;
scanning said washed plurality of flakes to identify any of said plurality of flakes that comprise material other than PET; and
removing at least one of said identified flakes that comprise material other than PET.

9. The method of claim 1, wherein, after said step of passing said melt of recycled polymer through said multi-screw extruder, said polymer melt has an intrinsic viscosity of between about 0.79 dL/g and about 1.00 dL/g.

10. The method of claim 1, further comprising, after said step of passing said melt of recycled polymer through said multi-screw extruder, passing said polymer melt though at least one filter having a micron rating of less than about 25 microns.

11. The method of claim 1, wherein said step of forming said recycled polymer into bulked continuous carpet filament comprises spinning said polymer melt to form said bulked continuous carpet filament.

12. The method of claim 1, further comprising, before said step of forming said recycled polymer into bulked continuous carpet filament:
using a viscosity sensor to determine whether an intrinsic viscosity of at least a portion of recycled polymer is within a pre-determined range; and
in response to determining said intrinsic viscosity is not within a predetermined range, adjusting said pressure regulation system to lower said internal pressure of said extruder.

13. A method of manufacturing bulked continuous carpet filament, said method comprising:
(A) providing a multi-screw extruder that comprises:
at least six satellite screw extruders, wherein each of said at least six satellite screw extruders comprise a satellite screw mounted to rotate about a respective central axis of each of said at least six satellite screw extruders; and
a pressure regulation system that is adapted to maintain a pressure within said at least six satellite screw extruders between about 0 millibars and about 5 millibars;
(B) using said pressure regulation system to reduce a pressure within said at least six satellite screw extruders to between about 0 millibars and about 5 millibars;
(C) while maintaining said pressure within said at least six satellite screw extruders between about 0 millibars and about 5 millibars, passing a melt comprising recycled polymer through said multi-screw extruder so that at least a portion of said melt passes through each of said at least six satellite screw extruders;
(D) after said step of passing said melt of recycled polymer through said multi-screw extruder, forming said recycled polymer into bulked continuous carpet filament.

14. The method of claim 13, wherein said multi-screw extruder comprises a satellite screw extruder support system that is adapted to rotate said at least six satellite screw extruders about a main axis that is substantially parallel to each said respective central axis of each of said at least six satellite screw extruders.

15. The method of claim 14, wherein said step of passing said melt of recycled polymer though said multi-screw extruder occurs while said at least six satellite screw extruders are orbitally rotating about said main axis.

16. The method of claim 15, wherein said pressure regulation system comprises a jet vacuum pump.

17. A method of manufacturing carpet filament comprising the steps of:
(A) washing a group of polymer flakes to remove at least a portion of one or more contaminants from a surface of said flakes, said group of flakes comprising a first plurality of flakes that consist essentially of PET and a second plurality of flakes that do not consist essentially of PET;
(B) after said step of washing said first plurality of flakes:
(i) scanning said washed group of flakes to identify said second plurality of flakes,
(ii) separating said second plurality of flakes from said first plurality of flakes;
(C) after separating said second plurality of flakes from said first plurality of flakes, melting said second plurality of flakes to produce a polymer melt;
(D) providing an extruder that extrudes material in a plurality of different extrusion streams;
(E) reducing a pressure within said extruder to between about 0 millibars and about 5 millibars;
(F) while maintaining said pressure within said extruder between about 0 millibars and about 5 millibars, passing said polymer melt through said extruder so that said polymer melt is divided into a plurality of extrusion streams, each having a pressure between about 0 millibars and about 5 millibars;

(G) after passing said polymer melt through said extruder, filtering said polymer melt through at least one filter; and (H) after passing said polymer melt through said filter, forming said recycled polymer into bulked continuous carpet filament.

18. The method of claim 17, wherein said extruder comprises:

(A) a first satellite screw extruder, said first satellite screw extruder comprising a first satellite screw that is mounted to rotate about a central axis of said first satellite screw;

(B) a second satellite screw extruder, said second satellite screw extruder comprising a second satellite screw that is mounted to rotate about a central axis of said second satellite screw;

(C) a pressure regulation system that is adapted to maintain a pressure within said first and second satellite screw extruders between a pressure of about 0 millibars and about 5 millibars as said polymer melt passes through said first and second screw extruders; and (D) a satellite screw extruder support system that is adapted to orbitally rotate said first and second satellite screws about a main axis as said polymer melt passes through said first and second screw extruders, said main axis being substantially parallel to both: (1) said central axis of said first satellite screw; and (2) said central axis of said second satellite screw.

19. The method of claim 18, wherein:

said extruder comprises:

(A) a third satellite screw extruder, said third satellite screw extruder comprising a third satellite screw that is mounted to rotate about a central axis of said third satellite screw; and (B) a fourth satellite screw extruder, said fourth satellite screw extruder comprising a fourth satellite screw that is mounted to rotate about a central axis of said fourth satellite screw;

said pressure regulation system is further adapted to maintain a pressure within said third and fourth satellite screw extruders between a pressure of about 0 millibars and about 5 millibars as said polymer melt passes through said third and fourth extruders; and said satellite screw extruder support system is further adapted to orbitally rotate said third and fourth satellite screws about said main axis as said polymer melt passes through said third and fourth screw extruders.

20. The method of claim 19, wherein said at least one filter comprises:

a first filter having a micron rating of less than about 50 microns; and a second filter having a micron rating of less than about 30 microns.

* * * * *